United States Patent [19]

Shiomi et al.

[11] Patent Number: 4,538,950
[45] Date of Patent: Sep. 3, 1985

[54] AUTOMATIC SYSTEM FOR CONVEYING WORKS IN A MACHINE SHOP

[75] Inventors: Tadataka Shiomi; Kouichi Nabika, both of Gifu; Takashi Kawagoe, Shiga, all of Japan

[73] Assignee: Murata Kikai Kabushiki Kaisha, Japan

[21] Appl. No.: 380,820

[22] Filed: May 21, 1982

[30] Foreign Application Priority Data

May 25, 1981 [JP] Japan ................................. 56-79588

[51] Int. Cl.$^3$ ............................................. B65H 5/04
[52] U.S. Cl. ................................. 414/222; 104/1 R; 104/48; 108/51.1; 108/53.1; 414/351; 414/392; 414/396; 414/749
[58] Field of Search .............. 414/523, 495, 401, 353, 414/351, 347, 222, 584, 225, 392, 396; 198/339, 472; 269/13, 14, 58, 61, 71, 99, 100; 238/134, 135; 108/51.1, 55.1, 55.3, 53.1; 104/162, 48, 1 R

[56] References Cited

U.S. PATENT DOCUMENTS

| | | | |
|---|---|---|---|
| 1,033,758 | 7/1912 | Howell | 269/99 X |
| 2,477,250 | 7/1949 | Hincz | 414/347 X |
| 3,865,360 | 2/1975 | Schweidler | 269/100 |
| 3,971,314 | 7/1976 | Box | 108/51.1 |
| 4,207,821 | 6/1980 | Beckert | 104/119 |
| 4,227,463 | 10/1980 | Pfleger | 104/48 X |
| 4,373,840 | 2/1983 | Miller, Jr. | 414/225 |
| 4,394,897 | 7/1983 | Brems | 198/345 |

FOREIGN PATENT DOCUMENTS 68209  3/1915  Austria ............................. 414/222

Primary Examiner—Robert J. Spar
Assistant Examiner—Donald W. Underwood
Attorney, Agent, or Firm—Spensley Horn Jubas & Lubitz

[57] ABSTRACT

A system is disclosed for automatically transporting works between an automated warehouse and a machine tool, and for maintaining the works in a precise position with respect to the machine tool. The system includes an automated warehouse, a pallet for precisely holding works, a truck for carrying the pallet, the truck moving along rails between the warehouse and a work exchanging apparatus adjacent to a machine tool table, and a device for positioning the pallet on the machine tool table precisely with respect to the machine tool. The work exchanging apparatus operates to transfer a pallet which holds unmachined works from the truck to the machine tool table and to transfer a pallet holding machined works from the machine tool table to the truck. The pallet, machine tool table, truck and work exchanging apparatus include means to position the pallet so that after a work is initially positioned on the pallet, the work will be precisely positioned with respect to the machine tool. The truck includes means for positioning the truck along the rails with respect to the warehouse and work exchanging apparatus.

4 Claims, 23 Drawing Figures

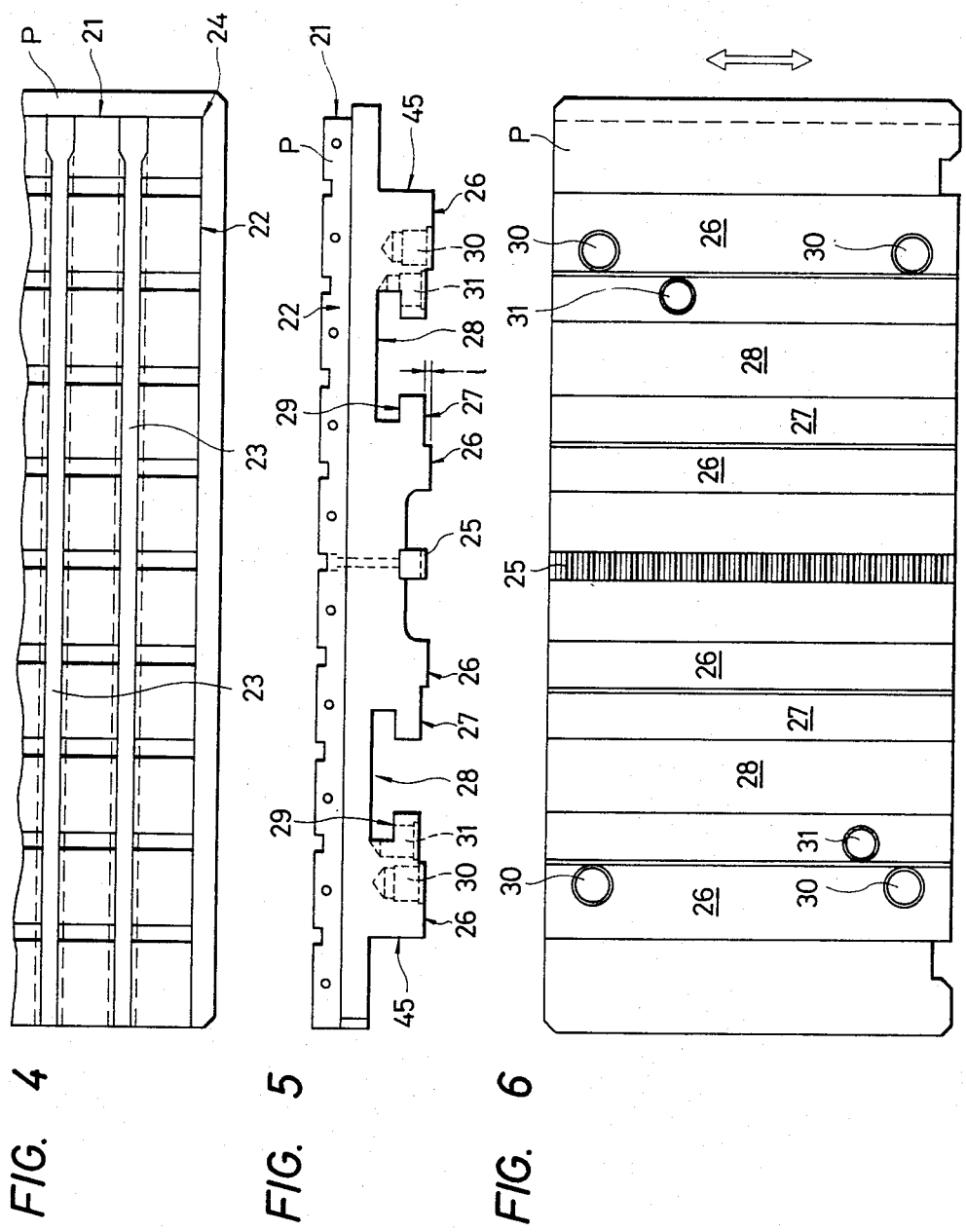

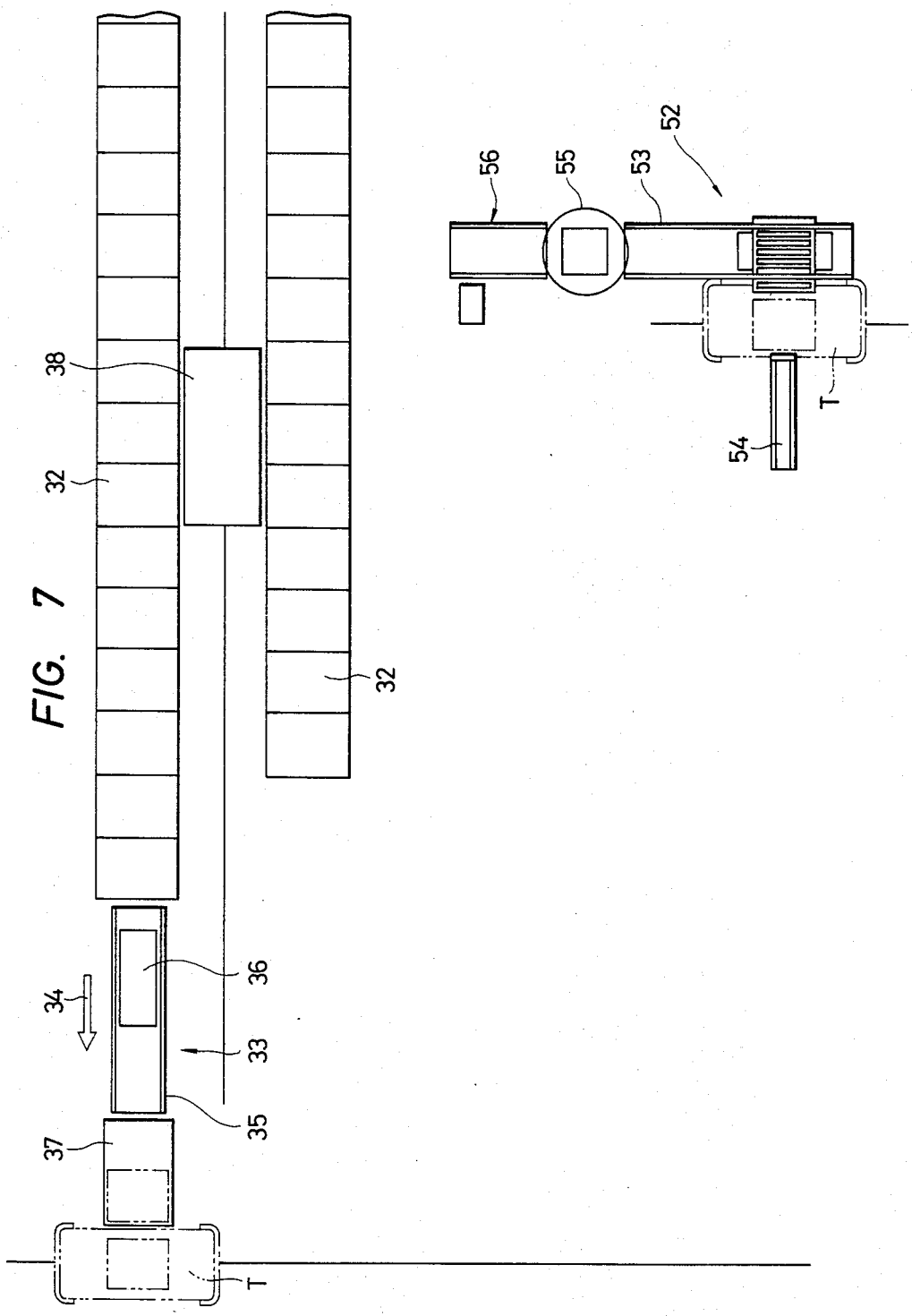

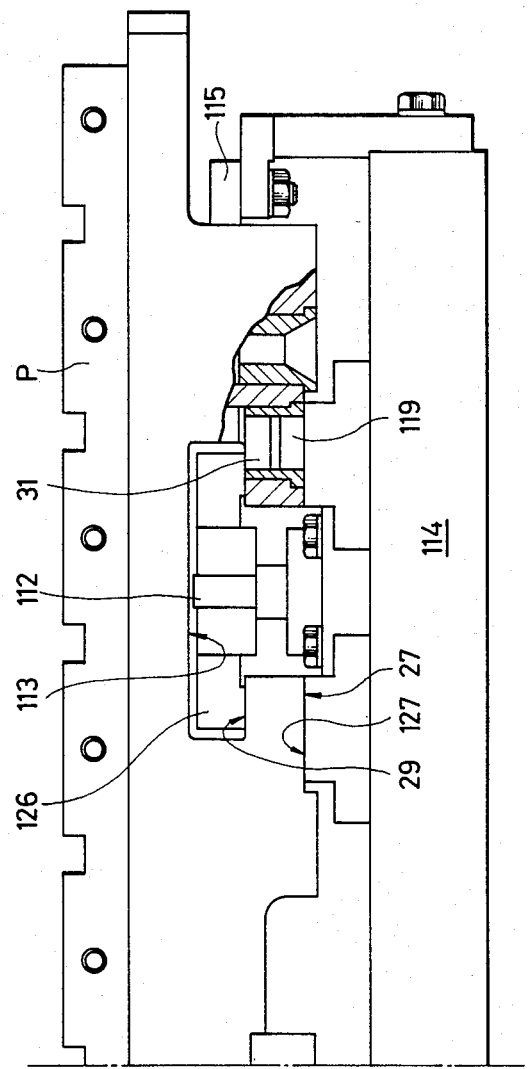

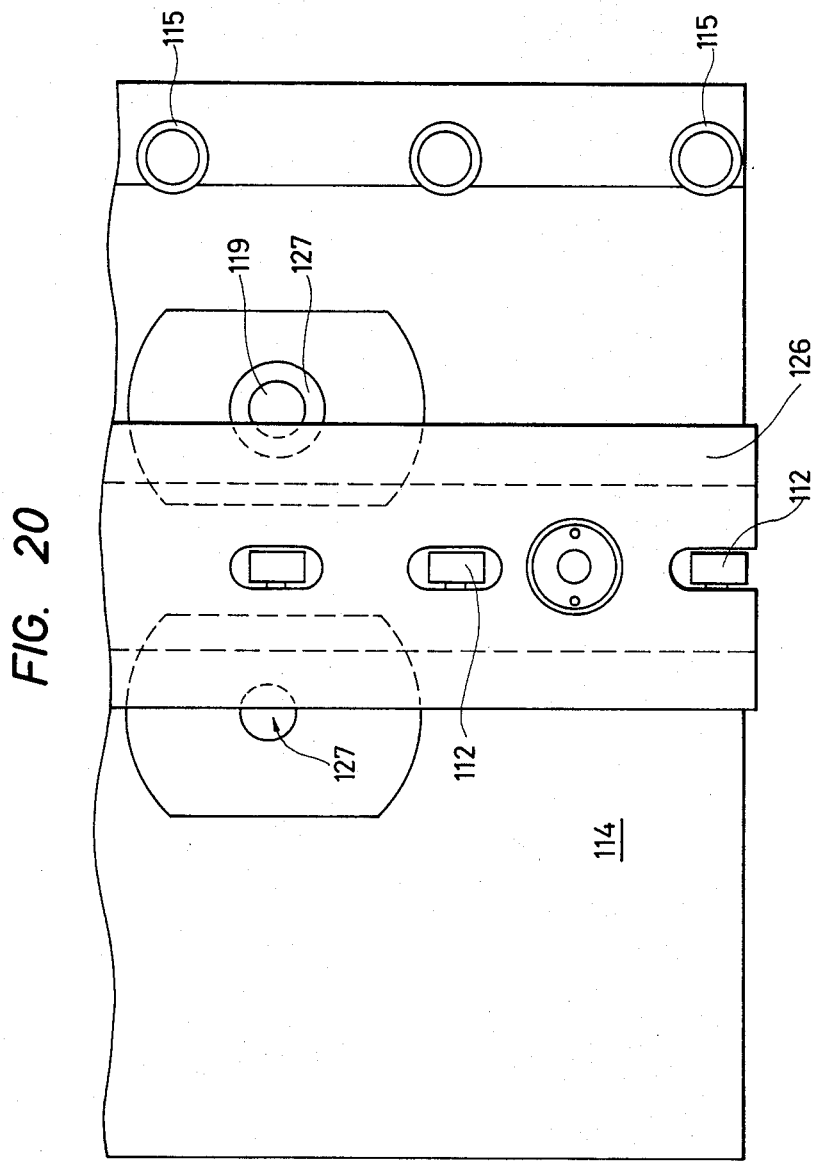

AUTOMATIC SYSTEM FOR CONVEYING WORKS IN A MACHINE SHOP

BACKGROUND OF THE INVENTION

Automatic machining has been considerably developed by application of NC (or numerically controlled) machine tools or robots etc. That is, an unmanned operation has been realized in a machining center unit such as a machining center having a multi-sided pallet conveyer.

However, flow of materials in a machine shop, that is, a discharge of works from a warehouse, transfer and delivery of the works from the warehouse to the machine tools, and discharge of works after machining have been performed by workers. Such workers may have to handle heavy materials which continually cause possible danger and limit operational efficiency. In such a machine shop, various shapes of works to be machined may have to be handled. It is very troublesome to convey and precisely position such various works on the tables of the machine tools using the, skills and experiences of such workers.

Thus, automation of material-flow in a machine shop, by which various works are automatically conveyed and positioned and the works after machining are automatically conveyed, is required, with such various shapes of works being delivered onto the machine tools at high accuracy.

SUMMARY OF THE INVENTION

The present invention relates to an automatic system for conveying works in a machine shop.

It is an object of the present invention to overcome the above-mentioned problems to meet the above requirements and to enable automation of delivery and positioning of works to be machined and discharge of works after machining, whereby the flow of materials in a machine shop is systemized so that an unmanned machine shop may be provided.

According to the present invention, there is provided a setting area where works may be securely positioned on a pallet of a predetermined standard, on which materials to be machined (hereinafter referred to as "works") are pre-set. After being pre-set, the works are stored in an automatic warehouse. Upon command from a machine tool, a pallet automatically discharged from the warehouse is carried to the machine tool such as a machining center etc. by means of an automatic conveyer truck and is directly loaded on an automatic work-replacing apparatus mounted on the machine tool. Works after machining are carried to a next process or a warehouse. In delivering the pallet between the conveyer truck and each apparatus, the position of the pallet is directly controlled by guiding a conveying surface underside of the pallet and side faces of the pallet respectively. Positioning of the pallet on a table of a machine tool may be performed in the three dimensional directions i.e. upwardly-and-downwardly, right-and-left, and front-and-back by means of a reference surface under side of the pallet and a positioning device. Thus, positioning of works may be accomplished by direct control of the pallet in attitude.

More specifically, the present invention comprises an automatic system for conveying a predetermined standard of a pallet on which a work is securely positioned between a warehouse and machine tools. Between a loading station at the warehouse side and an automatic work-replacing apparatus installed on the machine tools, a conveyer truck travels along a path laid on the ground and is provided with a positioning device in order to stop a truck at the predetermined position on the path and a postioning means to support the pallet at a predetermined position on the truck; when the pallet is transferred from said loading station to the conveyer truck and is transferred from said conveyer truck to the automatic work-replacing apparatus, the pallet is directly controlled in positioning by means of guides so that the under-surface of the pallet and side face thereof are guided by the guides; and on the table of the machine tool, the pallet is supported on the table by abutting a reference surface at the under-side of the pallet against a reference surface of the table to directly control the positioning of the pallet.

Therefore, in the present system, since the conveying of the works between the warehouse and the machine tool is accomplished by means of controlling the positioning of the pallet, on which a work is secured at the predetermined position, a work having any shape may be extremely accurately and securedly positioned onto the table of a predetermined machine tool, the accuracy of which may be on the order of a few microns, whereby an automation of a machine shop is possible.

BRIEF DESCRIPTION OF DRAWINGS

FIG. 4 is a plan view of a pallet for securing a work thereon and for conveying the work.

FIG. 5 is a front view of the pallet shown in FIG. 4.

FIG. 6 is a bottom view of the pallet shown in FIG. 4.

FIG. 7 is a plan view showing a lay-out of a line for receiving works into and for discharging works from shelves.

FIG. 17 is a partial sectional front view showing the pallet which is positioned and secured in the table of the machine tool.

FIG. 20 is a plan view of a pallet securing apparatus.

DETAILED DESCRIPTION OF THE INVENTION

The present invention will be described in more detail with reference to the accompanying drawings.

Figure 1:
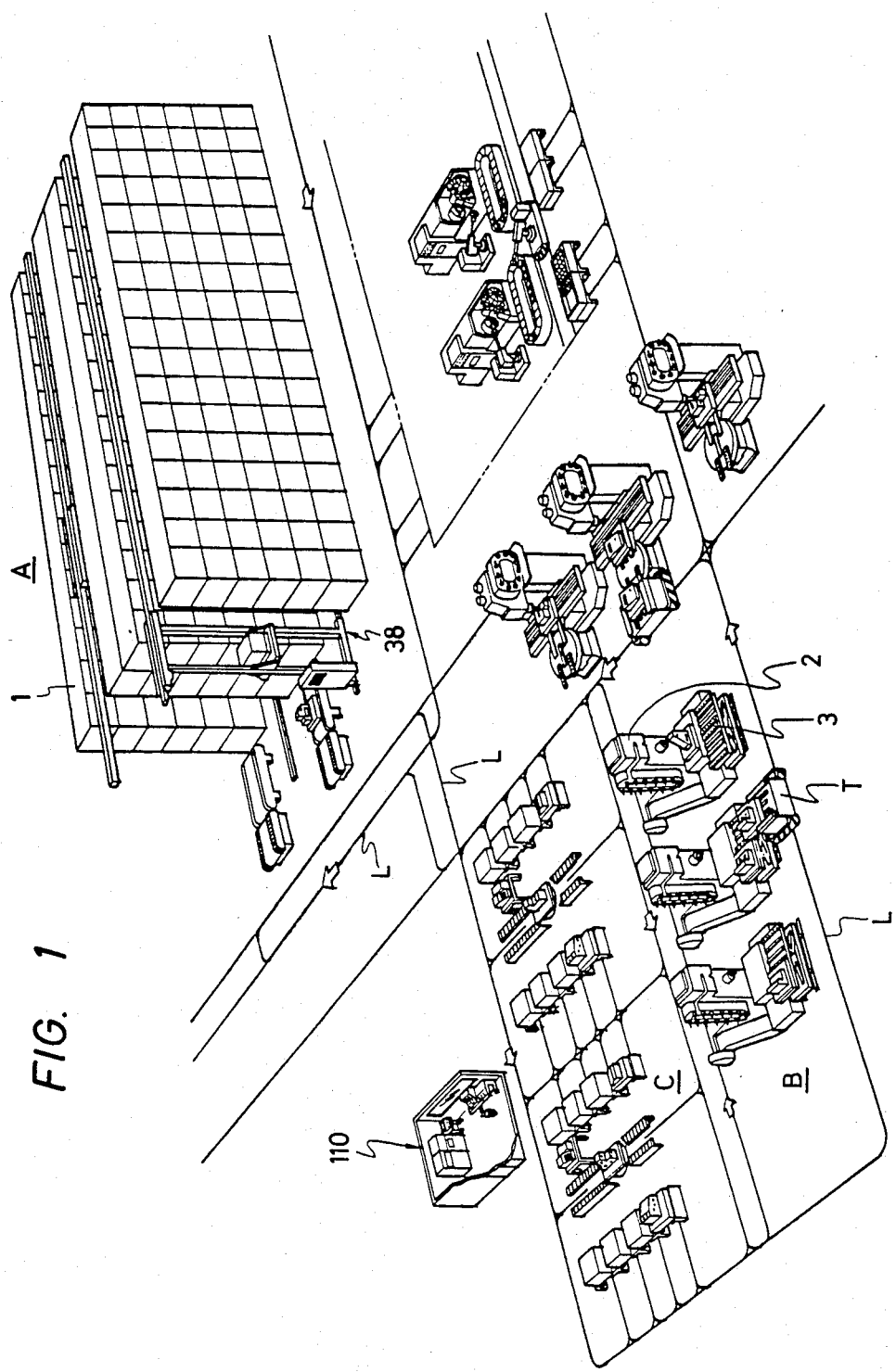
FIG. 1 is a schematic perspective view showing an embodiment of a lay-out in a machine shop for carrying out the system in accordance with the present invention.

FIG. 1 is a diagramatic lay-out showing the system according to the present invention.

A work-storing area (A) constructed from an automatic warehouse 1, a work-machining area (B) constructed from a machine tool 2 such as an NC machining center etc. and an automatic work-replacing apparatus, and a setting area (C) for presetting a work on a pallet are communicated with each other by means of an induction line (L) for a conveyer truck (T).

Figure 2:
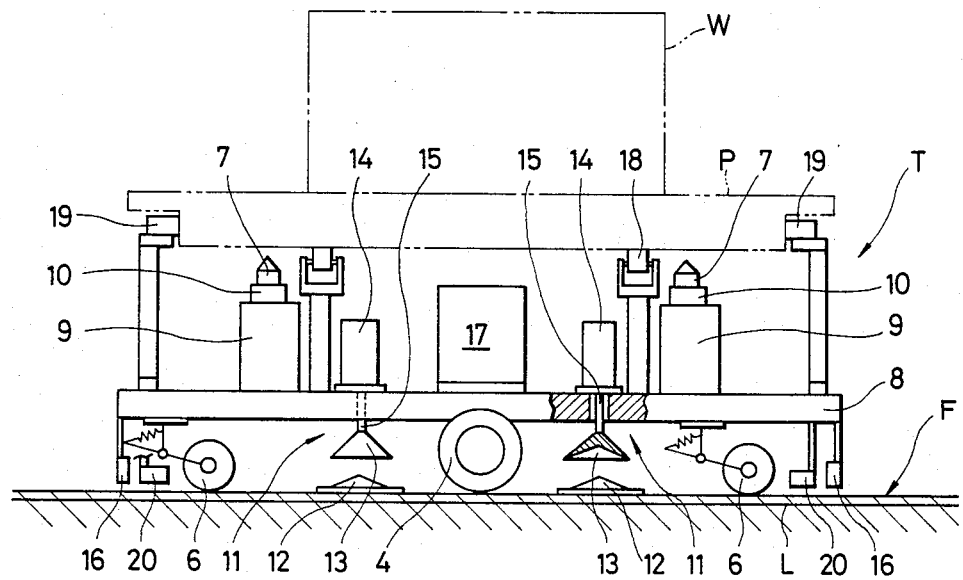
FIG. 2 is a partial sectional side view showing a construction of a conveyer truck applied to the system.
Figure 3:
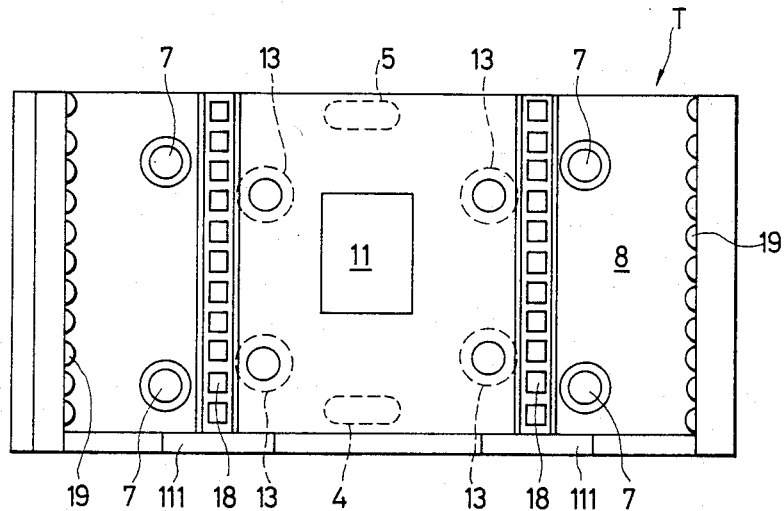
FIG. 3 is a plan view showing the conveyer truck in FIG. 2.

The conveyer truck (T) is shown in FIG. 2 and FIG. 3 as examples. The conveyer truck (T) includes two driven wheels 4, 5 and one or more support wheels 6. Each of two driven wheels 4, 5 is provided with a motor and a brake. A bush 7, on which a pallet (P) is supported, is secured on the upper end of a corresponding piston rod 10 which is slidably engaged into a cylinder 9, which in turn is secured on a base frame 8. The upper end of the bush 7 is conically shaped so as to fit into a positioning hole defined in the under-side of the pallet (P) on which a work (W) is secured.

The positioning hole of the pallet (P), into which the bush may be fitted, has an interior concave surface conically shaped. The truck (T) is equipped with a positioning device 11 to position the truck (T) with respect to the ground (F). Cone bodies 12 are secured on the ground (F) in positions for the truck (T) to be stopped, while the truck (T) is provided with four cone plates 13 adapted to engage with the cone bodies 12. The cone plates 13 are securely attached on the lower end of a piston rod 15 slidably engaged into a cylinder 14 fixedly and vertically mounted on the truck (T).

An antenna is designated 16 and a battery is designated 17. Induction lines (L) for transmitting signals to the antenna 16 are burried under the ground (F).

Figure 21:
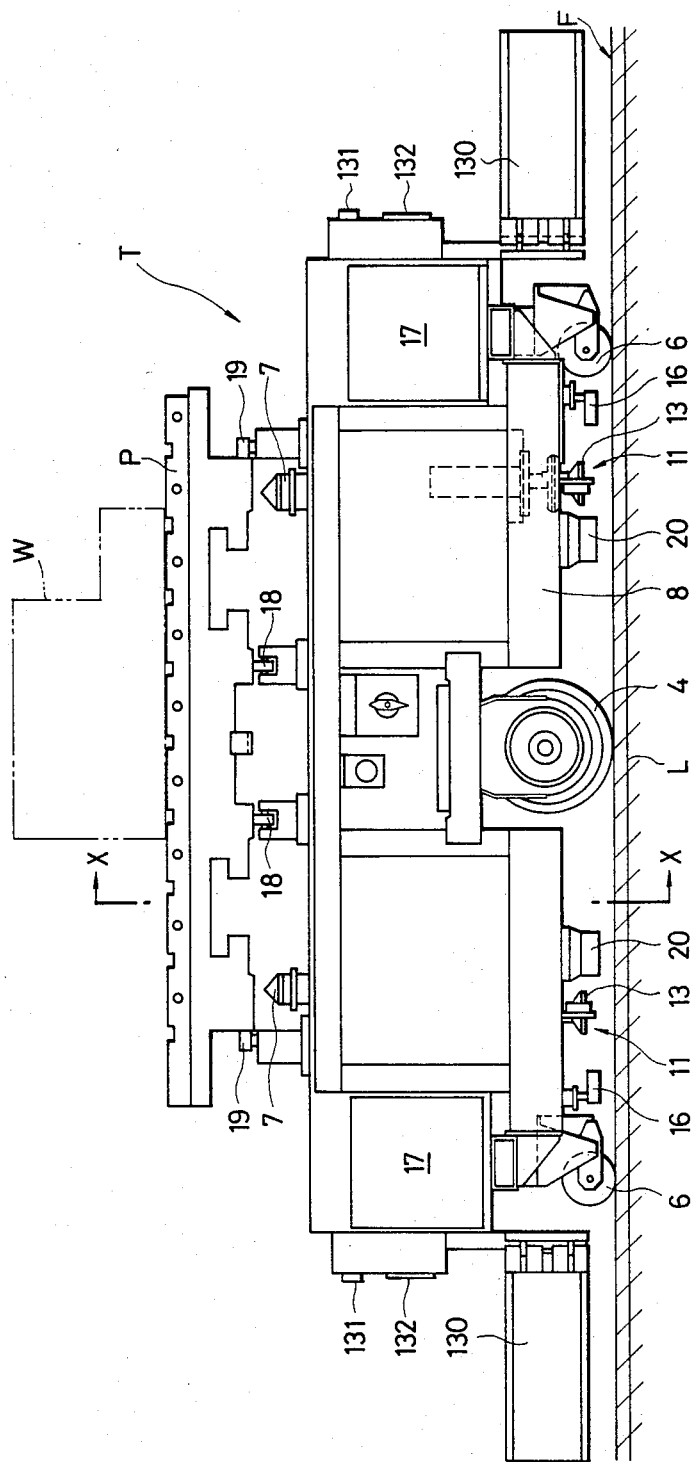
FIG. 21 is a detailed view showing the construction of the conveyer truck.
Figure 22:
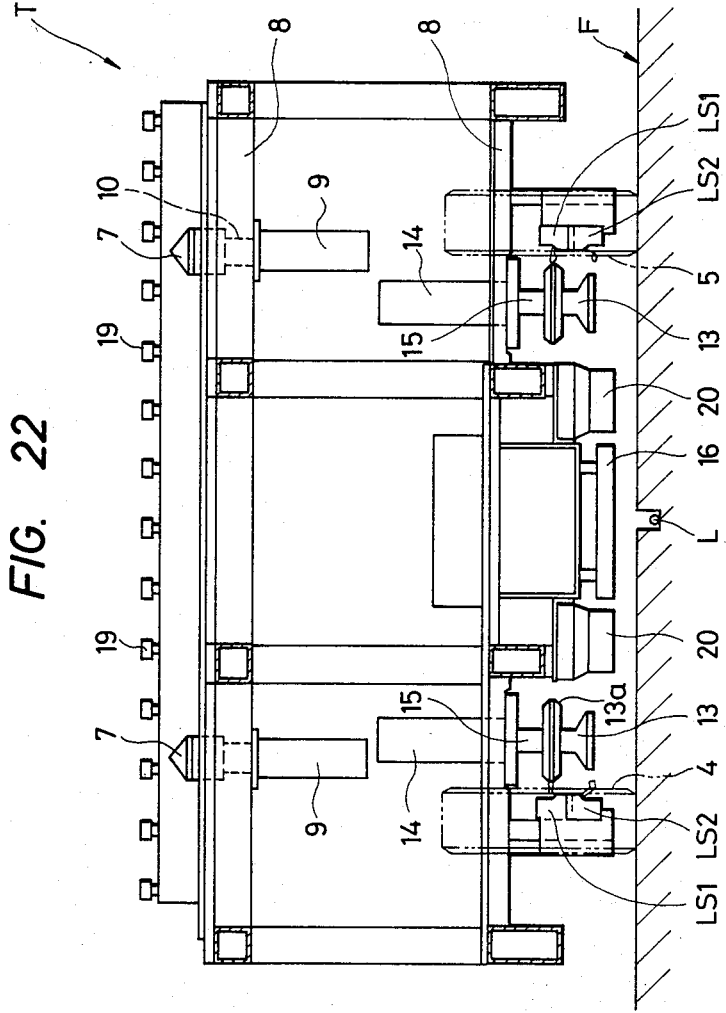
FIG. 22 is a sectional view taken along line X—X of FIG. 21.
Figure 23:
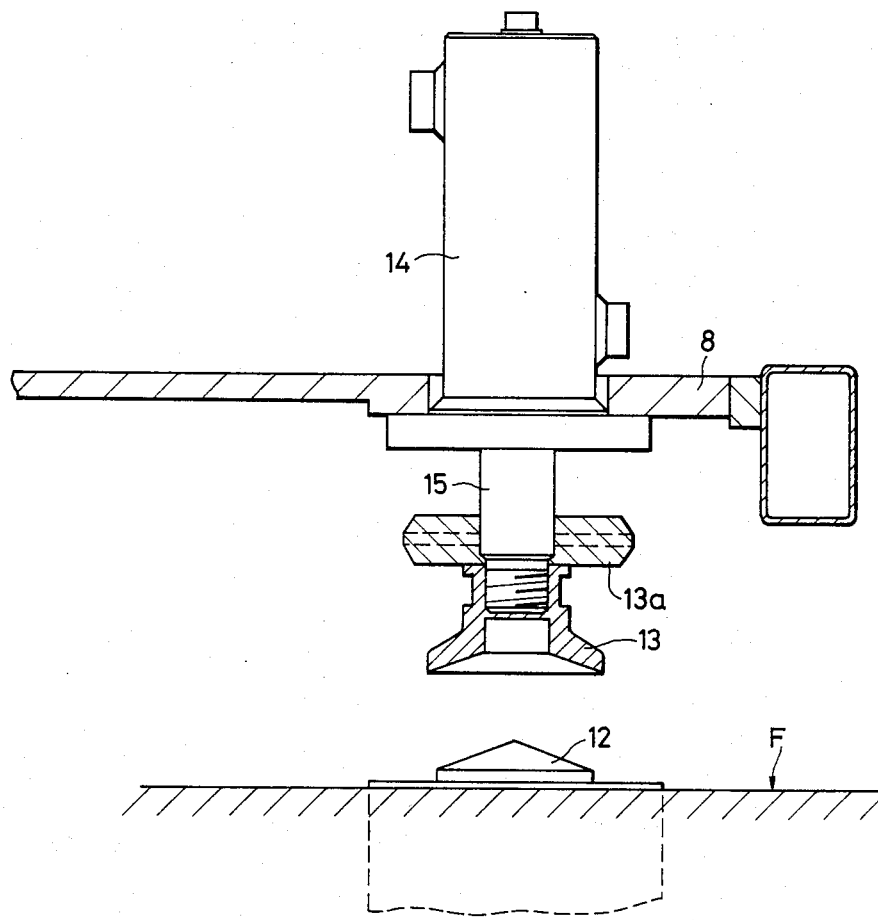
FIG. 23 is an enlarged sectional view of a device for positioning the truck with respect to the ground.

Referring to FIG. 21, FIG. 22 and FIG. 23, on the underside of the truck (T), there are provided limit switches LS1 and LS2 for detecting upper limit and lower limit positions of the cone plates 13 respectively. On the piston rod 15, a disk-like dog 13a, which is adapted to engage with the limit switches LS1 and LS2, is secured. When the truck (T) travels, and the dog 13a is in engagement with an actuator of the limit switch LS1. After the truck (T) has been stopped at a predetermined position, an actuation of the cylinder 14 causes the cone plate 13 to be lowered toward the cone body 12 on the ground (F). Engagement between the dog 13a and the limit switch LS2 causes the piston rod 15 to be stopped, whereby the truck (T) is positioned at a predetermined position in the three dimensional directions i.e. upwardly-and-downwardly, right-and-left, and front-and-back being raised and kept above the ground (F). Furthermore, in FIG. 21, a bumper 130 is pivotally mounted in the horizontal direction on the front and back portions of the truck (T) respectively, so that when the bumper 130 is contacted with any obstacle it is shifted, resulting in stoppage of the truck (T). 131 designates a pilot lamp showing that the truck (T) is travelling, and 132 designates a connector for charging a battery.

The truck (T) is equipped with guide rollers 18 and 19 for guiding the pallet (P) during conveying-in and conveying-out thereof, the guide roller 18 guiding the conveying surface underside of the pallet (P), the guide roller 19 guiding the side face of the pallet (P).

Thus, the truck (T) may be travelled along the induction lines (L) while the antennas 16 is seeking for the induction line (L). During this travelling, when two driven wheels 4 and 5 are rotated at the same speed the truck (T) may be travelled along a straight path on the induction lines (L), and when the driven wheels 4, 5 are rotated at different speeds with respect to each other the truck (T) may be travelled along a curved path on the induction lines (L). The rotational speeds of the driven wheels 4, 5 may be feed-back-controlled by means of tachometers. Further, when the proximity switches 20 on the truck (T) detect any of the sensitive plates arranged on the ground (F) along the induction lines (L), a calculation apparatus such as a computor is actuated, which results in a stoppage of the truck (T). After this stoppage of the truck (T), the piston rod 15 is lowered for the cone plate 13 to be fitted onto the cone body 12 so that the truck (T) is somewhat raised to thereby be securedly positioned on a predetermined location at a precision in order of milli-meter.

Referring now to FIG. 4, FIG. 5, and FIG. 6, the pallet (P) will be described, on which the work (W) is fixedly supported. The pallet (P) includes reference surfaces 21 and 22 at its upper portions and includes ball-engaging-grooves 23 for mounting the work (W) and a jig on the pallet (P) at the upper surface thereof. The work (W) is set at a predetermined position with respect to the origin 24 of the pallet (P). Underside of the pallet (P), a rack 25 is provided over the entire width of the pallet (P) and at the intermediate longitudinally of the pallet (P), the rack 25 being adapted to be engaged with a pinion provided on an automatic work-replacing apparatus as herein after described. The pallet (P) is formed with conveying surfaces 26 underside of the pallet (P) and at both sides of the rack 25 in longitudinally spaced relationship. The conveying surfaces 26 are adapted to bear against the guide roller 18 (in FIG. 2). Reference surfaces 27 and 27 are defined, each of which is adjacent to the conveying surface 26 in the direction away from the rack longitudinally and is slightly upwardly spaced apart from the conveying surface 26 by the length "1". Consequently, while the pallet (P) is transferred on chain conveyer or guide rollers with the conveying surfaces 26 being contacted with them, the reference surfaces 27 can not be abutted with guide rollers, so that the reference surface 27 may be prevented from damage. In order to secure the pallet (P) on a table of a machine tool, underside of the pallet (P) is defined with recesses 28 and abutted surfaces 29 which are adapted to be abutted with abutting members mounted on the table of the machine tool.

Further, at the underside of the pallet (P), there are defined four positioning holes 30 for positioning the pallet with respect to the conveyer truck (T), and there are also defined positioning holes 31 for positioning the pallet with respect to the table, the holes 30 being adapted to be engaged with conical bushes 7. The holes 30 in its internal upper extremity are conical-shaped, so that when corresponding conically shaped bushes 7 are fittedly inserted into the holes 30 they are automatically centered with respect to each other, which results in an accurate positioning between the pallet (P) and the truck (T) in order of milli-meter.

Each apparatus constructing the system in accordance with the present invention will be now described in detail.

FIG. 7 shows a construction of a line for entering-into and leaving-from a warehouse in a work-storing area (A) such as a warehouse. A loading-station 33 for discharging works from a shelf 32 is located at one end of the shelf 32 and the loading-station 33 comprises a chain-conveyer 35 which may be travelled in the direction of arrow 34 and a liftor 36 which is able to be raised above or lowered under a pallet supporting surface on the chain-conveyer 35 followed by a roller-conveyer 37 for controlling the location of the pallet (P). The pallet (P), on which a work (W) is secured, is transferred from a stacker crane 38 travelling along a path between shelves 32 and 32 through the liftor 36 onto the chain-conveyer 35 and therefrom through the roller-conveyer 37 onto the conveyer truck (T) located at a predetermined position near the end portion of the roller-conveyer 37.

Figure 8:
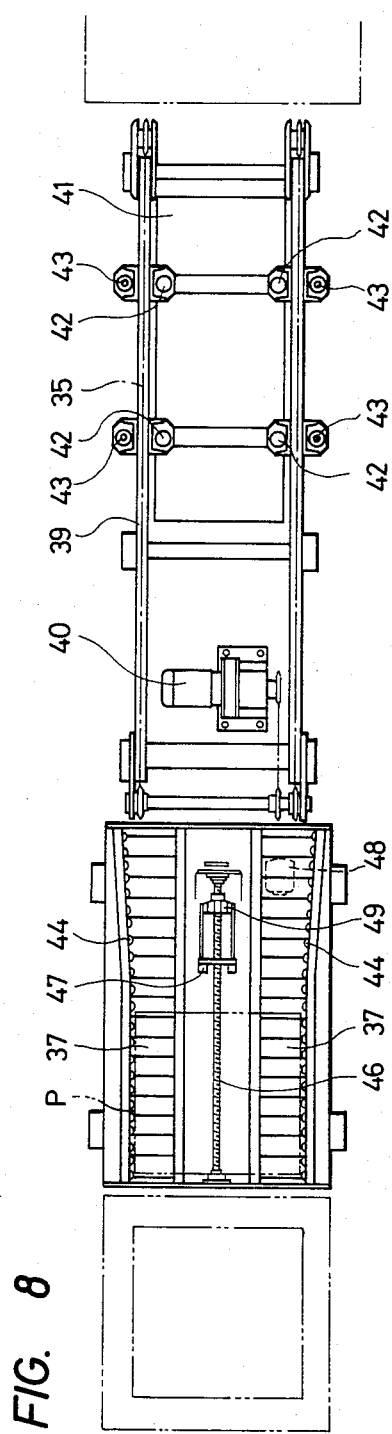
FIG. 8 is a plan view showing a loading-station for discharging works from shelves.
Figure 9:
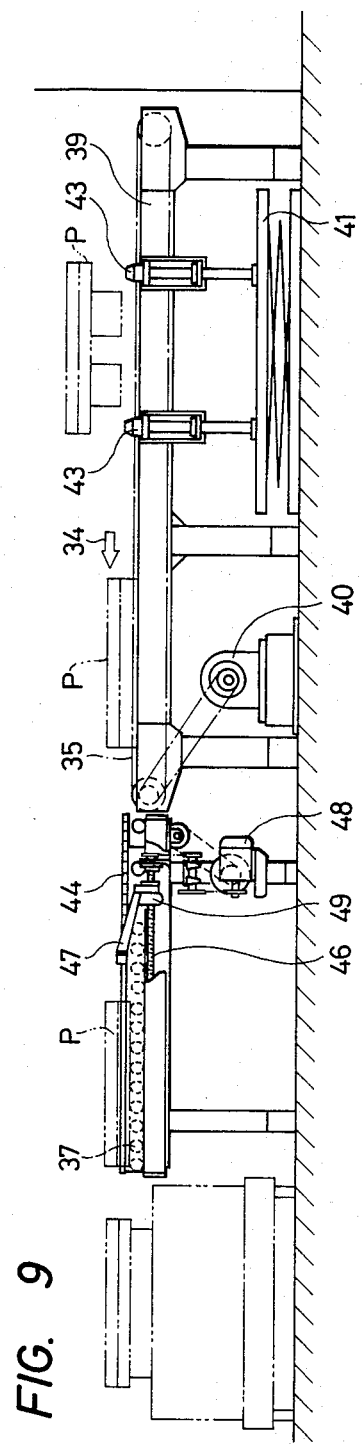
FIG. 9 is a side view of FIG. 8.

The construction of the loading-station 33 is shown in more detail in FIG. 8 and FIG. 9. The chain-conveyer 35 which is travelled along guide rails on a frame-work 39 is rotated by a motor 40 equipped with a reduction gear through a chain and a sprocket in a direction shown by an arrow 34. The liftor 36 capable of being raised above or lowered under the pallet supporting surface on the chain-conveyer 35 comprises a raising-lowering base 41 which may be raised or lowered by means of a fluid-cylinder (not shown), four struts 42 for supporting the pallet, the struts 42 being perpendicularly secured onto the raising-lowering base 41, and four guide columns 43 for controlling the location of the pallet in the width direction of the chain-conveyer 35. The struts 42, each of which includes an upper extremity having a plane so as to define the same plane as other three struts 42, may be raised or lowered inside of the chain-conveyer 35. The guide columns 43, each of which includes an upper extrimity of conical shape, may be raised or lowered outside of the chain-conveyer 35. The upper extrimities of the struts 42 are located in a position lower than the upper extrimities of the guide columns 43, so that when the pallet transferred on a fork of the stacker crane is transferred onto the struts 42 in a raised position the location of the pallet may be automatically controlled because the pallet may be automatically centered as the pallet is transferred with the side face of the pallet along the conical surface of the conical guide columns 43.

Figure 10:
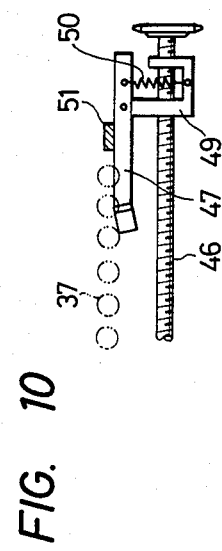
FIG. 10 is a schematic side view showing an embodiment of a pusher.

The pallet (P), which has been transferred onto the chain-conveyer 35, is further transferred onto the roller-conveyer 37. While the pallet (P) is travelled on the roller-conveyer 37, the side faces 45 (shown in FIG. 5) of the pallet (P) may be guided by guide rollers 44 which are arranged on both sides of the roller-conveyer 37 in a manner so that the distance between the guide rollers 44 and 44 on both sides will diverge in the direction of the inlet of the roller conveyer 37, thereby the location of the pallet (P) further being controlled, after which the pallet (P) may be transferred onto the conveyer truck (T). In addition, since means for conveying-in and conveying-out the pallet are not mounted on the truck (T), in order to completely transfer the pallet (P) on the roller conveyers 37 onto the truck (T), a pusher 47 which may be moved forwardly and backwardly by rotation of a screw rod 46 is provided between roller conveyers 37 and 37. That is, the pusher 47 is journalled on a supporting block 49 threaddedly engaged with the screw rod 46 which may be rotated in either direction by a motor 48 being rotated in the corresponding direction. The pusher 47 is spring-urged 50 in the direction to project upwardly from the pallet supporting surface of the rollers 37. When the pallet (P) is passed through bove the pusher 47, the under-surface of the pallet pushes downwardly the pusher 47 against the spring force. Alternatively, as shown in FIG. 10, the pusher 47 remains below the upper surface of the rollers 37 by means of a stationary block 51, during which the pallet (P) is passed through above the pusher 47 without any contact with each other, after which the screw rod 46 is rotated for the pusher 47 to be forwarded, whereby the pallet (P) may be passed through above the rollers 37 without suffering any damage to the under-surface of the pallet (P). When the pusher 47 is moved to the most forward position the pallet (P) may be completely transferred onto the truck (T).

Referring to FIG. 7, there is schematically illustrated a construction of a loading-station for receiving works into shelves. When machined works, tools, or jigs etc. are received into a warehouse, the number of the pallet (P), on which the works etc. conveyed by truck (T) are secured, is read out by means of the loading-station and then the pallet (P) is received into a predetermined shelf through the crane.

After the truck (T) has been stopped in a predetermined position by the side of an end portion of the chain-conveyer 53, the pallet (P) on the truck (T) is transferred onto a converter by the side of the chain-conveyer 53 by means of a pusher device 54 provided by the side of the truck (T). The pallet (P) is transferred from the converter onto the chain-conveyer 53 and then through a turn-table 55 to a pallet number reading-off section 56 and is stopped at a predetermined position through a stopper etc. At this position, the pallet number is read-off by a pallet number reading-off apparatus 57 as shown in FIG. 11 and FIG. 12.

Each pallet (P) includes a number defined by a combination between a convex surface 60 and a concave surface 59 respectively formed on the side face 58 of the pallet (P).

Figure 11:
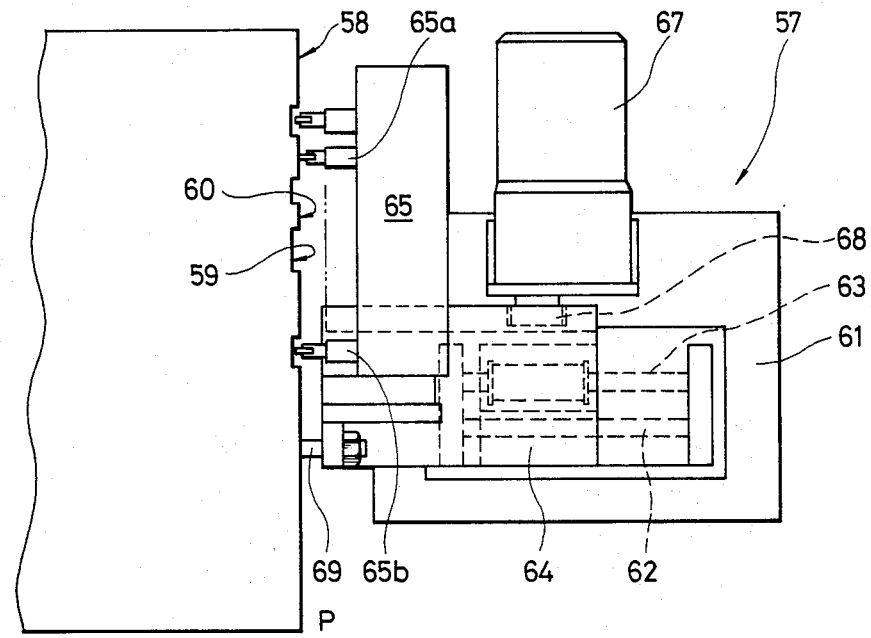
FIG. 11 is a plan view showing an embodiment of a pallet-number reading-off apparatus.
Figure 12:
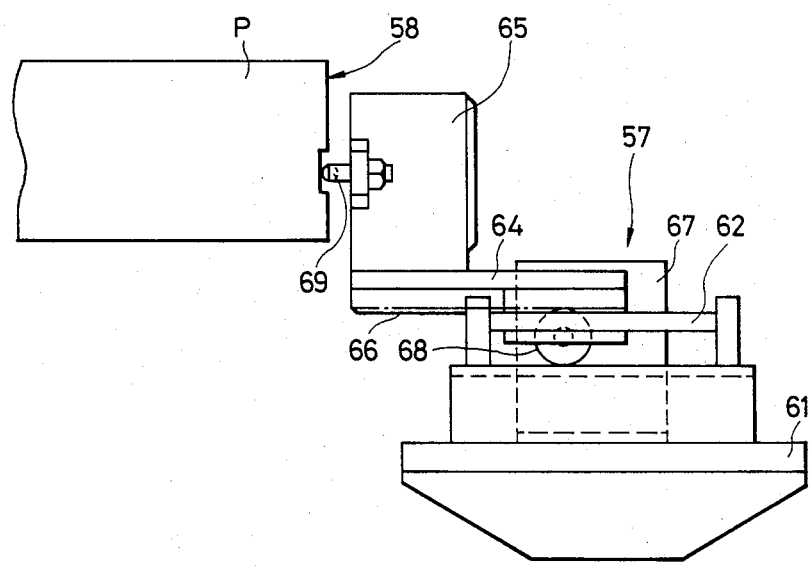
FIG. 12 is a side view of FIG. 11.

Referring to FIG. 11 and FIG. 12, the pallet number reading-off apparatus 57 comprises a movable plate 64 adapted to be moved along guide bars 62 and 63 securedly mounted on a base 61 and a group of limit switches 65 on the plate 64. The plate 64 is moved right and left by a motor 67 through a rack 66 provided at a under-surface of the plate 64 and through a pinion 68 engaged with the rack 66 and mounted on the output shaft of the motor 67.

The group of limit switches 65 provided on the plate 64 are arranged at a plurality of positions corresponding to the convex and concave surfaces 60, 59. When a stopper 69 of the movable plate 64 is abutted with the side surface 58 of the pallet (P), only a limit switch 65a corresponding to the convex surface 60 may be ON and a limit switch 65b corresponding to the concave surface 59 remains OFF. The pallet number is established with a combination of such ON-OFF signals to be read-off. The motor 67 may be a torque-motor. When the stopper 69 is abutted with the side surface of the pallet (P), the torque-motor is run idle so that the limit switch may be abutted with the convex surface 60.

Thus, the number of the pallet (P) on which the work (W) already machined is secured or which is pre-set may be read-off after which the pallet (P) may be received into a predetermined number of a shelf by the stacker crane.

Referring to FIG. 1, there will now be described in detail an automatic work-replacing apparatus 3 installed on a machine tool 2 such as a machining center. The automatic work-replacing apparatus 3 is arranged one at each machine tool 2 in FIG. 1. One automatic work-replacing apparatus 3 may be provided for a plurality of machine tools 2, the apparatus 3 being travelled on rails which are laid on floors in front of each machine tool and between them.

Figure 13:
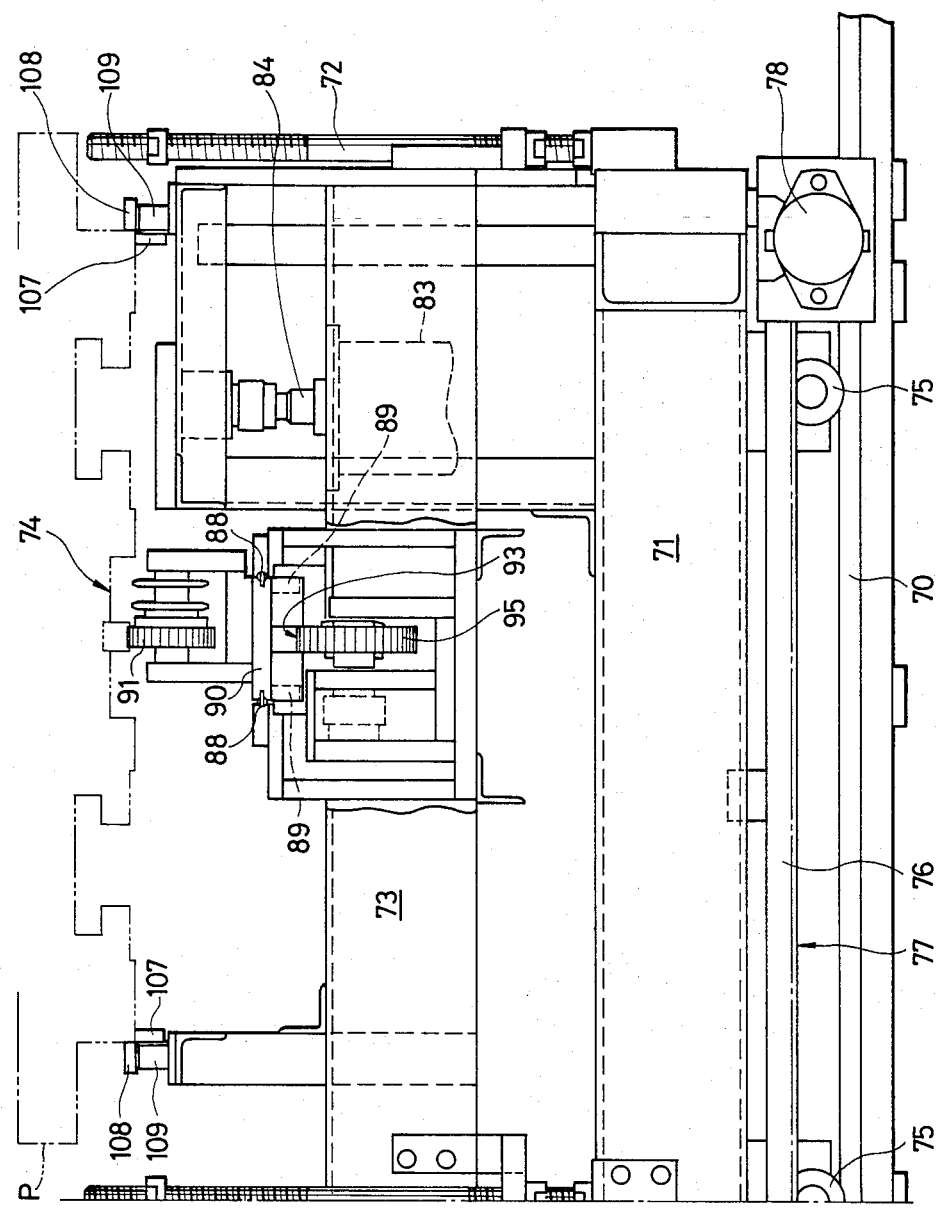
FIG. 13 is a front view showing an embodiment of one half of an automatic work-replacing apparatus.
Figure 14:
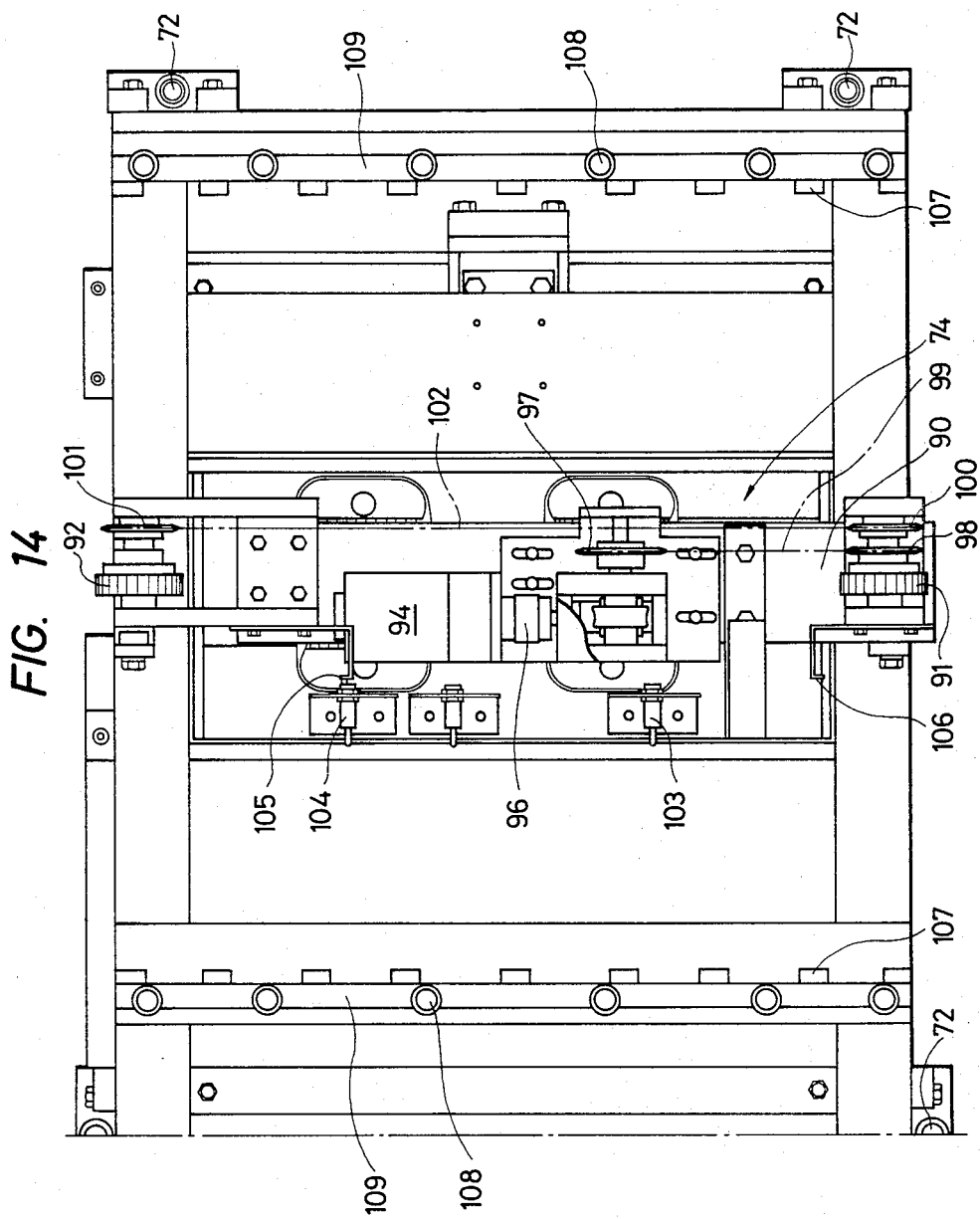
FIG. 14 is a plan view of FIG. 13.
Figure 15:
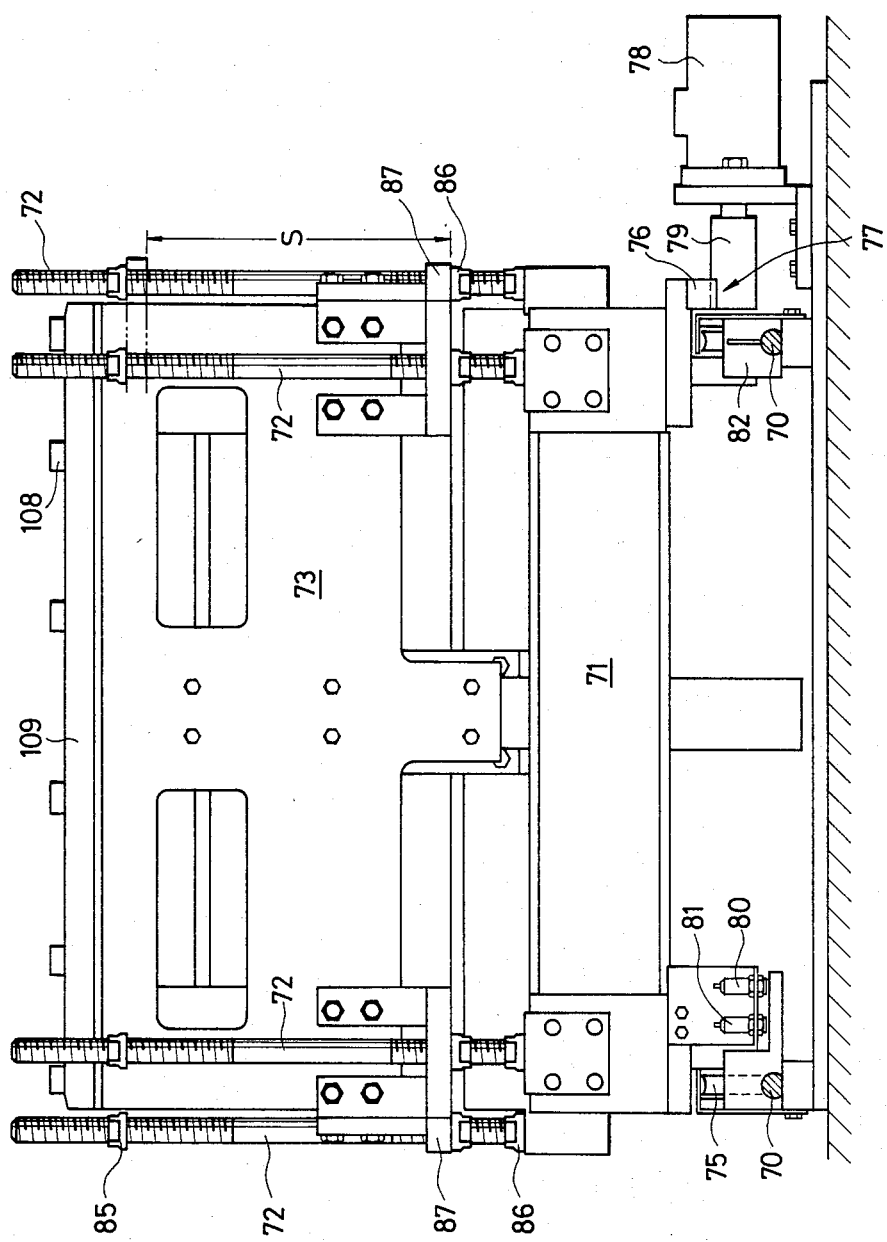
FIG. 15 is a side view of FIG. 13.

Referring to FIG. 13, FIG. 14, and FIG. 15, there is illustrated one half from the center line of the apparatus 3 but similar construction is provided symmetrically with respect to the center line. The automatic work-replacing apparatus 3 comprises a truck 71 which is movable in front of the machine tool right and left along rails 70 each having a circular cross-section, a base capable of raising-lowering along struts 72 mounted on four corners and a central portion of the truck 71 respectively, and a pallet transferring apparatus 74.

The truck 71 is mounted on the rails 70, 70 each having a circular cross-section through wheels 75, the truck 71 being travelled in front-back direction in FIG. 15 on the rails 70, 70 while a rack 77 provided over the entire undersurface of a frame-work 76 in the longitudinal direction of the truck 71 is engaged with a pinion 79 of the out-put shaft of a motor 78 installed on the ground when the motor 78 is driven. A position, on which the truck may be stopped, may be determined by a stopper 82 and by each two proximity switches 80, 81 provided in front and back of the truck 71 respectively. In addition, a circular cross-section of the guide rails 70 permits to be prevented from accumulation of swarfs on the rails 70 and to enhance accuracy for positioning the truck in the vertical direction.

A raising-lowering base 73 mounted on the truck 71 is connected to a piston rod 84 of electrically or fluidly actuated cylinder 83 which is vertically disposed into positions, one at the right as shown in FIG. 13 and the other in a like position in the non-illustrated left-hand half of the truck 71. Base 73 is supported by the struts 72 at four corners. The symmetrical right-and-left arrangement of the cylinders 83 avoids a deflection of the base 73 and maintains horizontally the upper surface of the base 73 during its raising-lowering motion. A vertical stroke (S) of the base 73 may be changed by adjustment of a distance between upper and lower nut-bodies 85 and 86 threadingly engaged with the struts 72 in FIG. 15. Upper and lower limits of the base 73 positions are respectively defined by positions corresponding to positions on which a block 87 inserted into the struts 72 secured on the base 73 is abutted with the nut bodies 85 and 86 respectively. In the present invention, the lower limit position of the base 73 is a pallet transferred position with respect to the conveyer truck, and the upper limit position of the base 73 is a pallet transferred position with respect to the machine tool 2.

A pallet transferring apparatus 74 provided on the base 74, as shown in FIG. 13, comprises a slider 90 slidable in the front-back direction in FIG. 13 along guide rails 88, 88 and guide rollers 89, 89 secured on the base 73, and pinions 91, 92 for drawing-out and drawing-in the pallet, the pinions 91, 92 being journaled at both end portions of the slider 90.

The slider 90 may be slid by engagement between a rack 93 provided on the under-surface of the slider 90 and a pinion 95 driven by a motor 94.

The pinions 91, 92 are provided at both end portions of the slider 90. The pinion 91 at one side of the conveyer truck is driven through sprockets 97, 98 and a chain 99 by means of a motor 96 mounted on the slider 90. The pinion 92 at the other side of the truck and adjacent machine tool is driven by means of a chain 102 spread between a sprocket 100 on the shaft of the pinion 91 and opposite sprocket 101. The pinions 91, 92 provided at both ends of the slider 90 are rotated at the same speed and in the same direction. In addition, extremity switches 103, 104 for detecting the forward end of the slider 90 may be actuated by iron pieces 105, 106 at the side of the slider 90.

On frames 109, 109 mounted on the base 73, there are rotatably mounted guide rollers 107, 107 for supporting under-surface of the pallet (P) and guide roller 108, 108 for guiding the side-face of the pallet and for controlling the lateral position of the pallet (P).

The above mentioned pallet transferring apparatuses 74, 74 are located at two places on the base 73. The right-hand apparatus is illustrated in FIGS. 13–14. The left-hand apparatus is not illustrated, but occupies a laterally symetrical position. One such apparatus supports an unmachined work, the other is empty i.e., waiting-for a chance. Thus, immediately after a work on the machine tool has been machined, this machined work is transferred onto the empty transferring apparatus 74. After the truck 71 is travelled at a predetermined distance and then is positioned at the location so that the pallet, on which the unmachined work is secured, may be set against the table of the machine tool, the empty transferring apparatus 74 is operated, thereby the unmachined work may be delivered onto the table so that any waiting time loss of the machine tool may be eliminated.

Operation of the work conveyance and supply in a machine shop as shown in FIG. 1 installed with above-mentioned elements or apparatuses will now be described. Incidentally, a signal order for driving the stacker crane 38 and conveyer truck (T) is received from the control room 110.

A work, which is pre-set at a predetermined position on a pallet in a setting area (C), is transferred to a loading-station for receiving works into shelves as shown in FIG. 7 by means of the conveyer truck (T), a pallet-number of the pallet (P) being read-off by means of a pallet-number reading-off apparatus 56 (FIG. 11, FIG. 12), the pallet (P) being housed into a shelf of a predetermined house number by means of a stacker crane.

Upon a signal order, the pallet (P), securely supporting a work (W) required, will be conveyed out of the shelf and be transferred onto the chain-conveyer 35 as shown in FIG. 8 and FIG. 9. At this time, the pallet (P) is position-controlled in the transverse direction of the conveyer along cone bodies of the upper ends of the guide columns 43 and is transferred onto the chain-conveyers 35, 35 with the under-surface or conveying surface 26 of the pallet (P) (FIG. 5) being supported on the conveyers 35, 35. While the pallet (P) is being transferred from the chain conveyers 35 onto the roller-conveyer 37, the pallet (P) is controlled in position by means of side guide rollers 44 the distance of which is diverged in the direction of the inlet side. The pallet (P) is further transferred onto the conveyer truck (T) by the pusher 47 as shown in FIG. 9. At this time, the conveyer truck (T), as shown in FIG. 2, has already been positioned at an accuracy in milli-meter order due to engagement between the cone bodies 12 and correspondingly lowered cone plates 13 on the truck (T). Thus the pallet (P) may be transferred onto the rollers 18, 18 of the conveyer truck (T) as shown in FIG. 2. With stoppers 111, 111 on the truck (T) being abutted with the pallet (P), the cylinders 9, 9 are actuated so that the conical bushes, 7, 7 disposed on the upper ends of the piston rods 10 may be advanced into conical concave holes 30 defined in the under-surface of the pallet (P) to be engaged to thereby position as well as raise the pallet (P) so as to be spaced apart from the upper-surface of the rollers 18, after which the conveyer truck (T) receiving a signal order from the control room 110 may be travelled along the induction lines (L).

The conveyer truck (T) holding the pallet (P) thereon is travelled toward the machine tool 2 and is stopped at a predetermined position when a proximity switch 20 on the truck (T) will detect an induction plate laid on a predetermined position on the ground in front of the automatic work-replacing apparatus 3 for the machine tool 2. At the abovementioned stoppage position, there is arranged the cone body 12 for positioning the truck on the ground similar to as shown in FIG. 2. In the same manner as described above, the conveyer truck (T) may be positioned at a predetermined position with respect to the automatic work-replacing apparatus 3 in an accuracy of milli-meter order. In this position, the piston rods 10, 10 on the conveyer truck (T) are lowered, after which the pallet (P) is again transferred onto the rollers 18, 18 on the conveyer truck (T).

Next, a pallet transferring apparatus 74 (FIG. 13, FIG. 14) of the automatic work-replacing apparatus 3 opposite to the conveyer truck (T) is actuated. Driving of a motor 96, as shown in FIG. 14, causes pinions 91, 92 on the extremities of the slider 90 to be rotated in the direction of drawing-in the pallet (P) on the conveyer truck (T). At the same time, driving of a motor 94 causes a pinion (FIG. 13) to be rotated so that the slider 90 is forwarded to the side of the conveyer truck (T) through racks 93 engaged with the pinions 91, 92. When the slider 90 is forwarded to a position as shown in the two dotted chain line 90a (FIG. 16), a pinion 91a on the slider extremity is engaged with a rack 25 provided on the center of the under-surface of the pallet (P) (FIG. 5, FIG. 6), whereby the pallet (P) may be drawn onto the guide rollers 107 (FIG. 13) on the automatic work-replacing apparatus 3. At the same time, the reverse driving of the motor 94 causes the slider 90 to be moved backward and to be returned to the original position. After the slider has been returned to the original position, transferring of the pallet (P) onto a raising-lowering base 73 may be accomplished only by rotation of the pinion 91. When a detector (not shown) for detecting a pallet deposited on the raising-lowering base 73 has detected the completion of the depositing of the pallet (P), the rotations of the pinions 91, 92 will be stopped for the pallet (P) to be stopped. While the pallet (P) has been positioned by side guide rollers 108, 108 at the right and left positions on the raising-lowering base 73.

The automatic work-replacing apparatus 3 waiting for a chance at the above-described condition may be transferred to a position corresponding to the table of the machine tool in response to a work supply signal order from the control room 110. At the same time, the cylinder 83 as shown in FIG. 13 is actuated so that the raising-lowering base 73 may be raised to the upper limit position of it along the structs 72.

Figure 16:
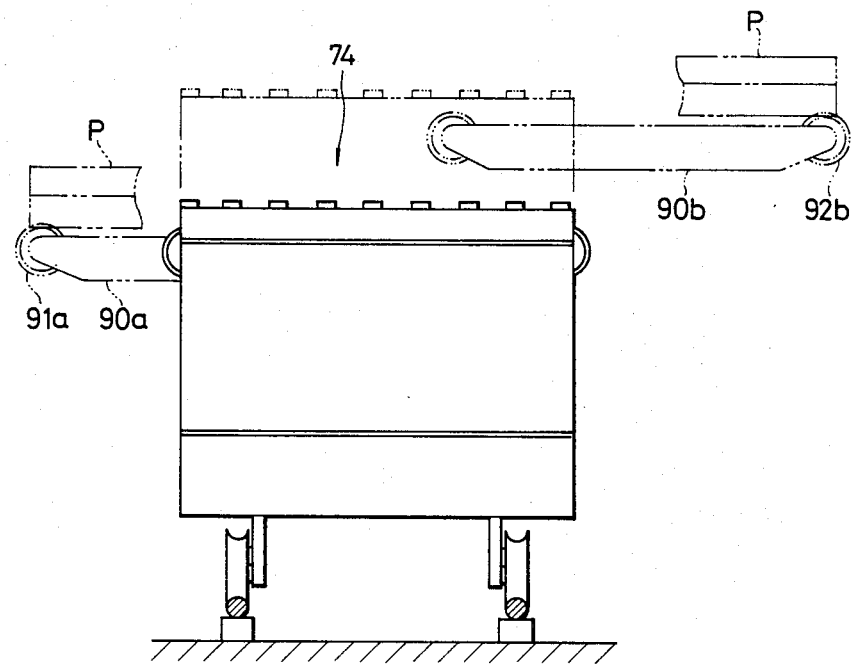
FIG. 16 is a side view showing the operation of the apparatus in FIG. 13.
Figure 18:
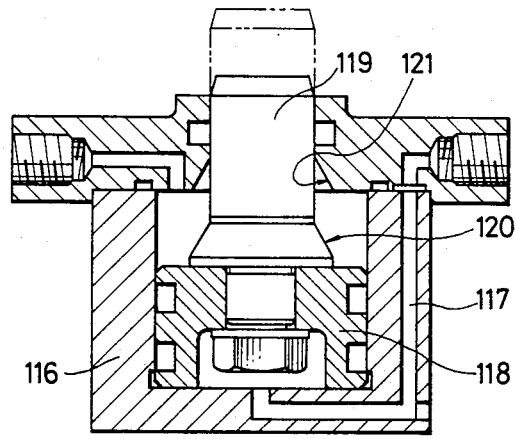
FIG. 18 is a sectional front view showing a pallet positioning cylinder mounted on the table of the machine tool.

At the upper limit position of the raising-lowering base 73, the slider 90 is forwarded to a position shown in the two-dotted chain line at the side of the table (FIG. 16). At the same time, the pinion 92b is rotated in the direction so that the pallet (P) may be pushed out to the table side of the machine tool. As a result, the pallet (P) is moved along the guide rollers 107, 108 on the raising-lowering base and then is transferred onto the guide rollers at the side of the table. On the table of the machine tool, there is provided a pallet positioning and securing apparatus as shown in FIG. 17 and FIG. 20. 112 designates a roller movable vertically by a fluid cylinder. When the roller 112 is in an upper position, the upper surface 113 of the cancave portion of the pallet (P) transferred from the automatic work-replacing apparatus is positioned on the roller 112, and the pallet (P) is guided at its both sides by the guide rollers 115 mounted on the table 114 to be transferred. After the pallet (P) has been stopped on the table at a stoppage position thereof, compressed air is delivered through a supply line 117 into the pallet positioning cylinder 116 (FIG. 18) i.e. to the under side of the piston 118 so that bushes 119 may be raised,. At the time when the frustoconical surface 120 of the bush is forwarded into engagement with the frustoconical surface 121 of the cylinder, the extremity of the bush is forwarded into engagement with the positioning hole 31 defined at the undersurface of the pallet (P), thereby the position of the pallet (P) may be fine-adjusted. The bushes 119 are provided in position corresponding to two places at the under-surface of the pallet (P).

Figure 19:
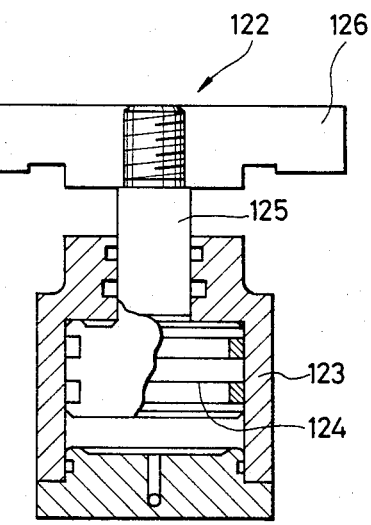
FIG. 19 is a sectional front view showing a clamp cylinder of the pallet.

After the pallet (P) has been accurately positioned on the table, a clamp device 122 as shown in FIG. 17, FIG. 19, and FIG. 20 is actuated. That is, descending motion of a piston 124 in a cylinder 123 (FIG. 19) causes a clamper 126 disposed on the upper extremity of a piston rod 125 to be lowered and to be abutted with the upper surface 29 of the concave portion of the pallet (P) (FIG. 17) so that the reference surface 27 of the pallet (P) is pressure-abutted to the reference surface 127 on the table 114, whereby the pallet (P) may be clamped. During the conveyance of the pallet (P), the reference surface 27 of the pallet (P) cannot be contacted with any other members, and only the conveying surface 26 located below the reference surface 27 is permitted to be contacted with other members. Therefore, extremely accurate positioning of the pallet may be accomplished without any damage on the reference surface 27.

In this manner, the work on the pallet (P) positioned at a predetermined location on the table in a setting area has been accurately and securely positioned in advance,. Accordingly, the work has been accurately positioned and secured on a setting position of the table.

Further, the work which has been machined is conveyed onto the conveying truck by reverse operation. If desired, in order to remove swarfs on the work and pallet, a swarf removing apparatus such as a pallet turningover apparatus which enables the work to turn over together with the pallet (P) may be employed and then the work and pallet transferred to the loading station for receiving works into shelves or a machine tool at a next step.

What is claimed is:

1. An automated system for conveying a pallet on which a work is securely positioned between a pallet warehouse and a machine tool table, the pallet of the type having a body which includes upper and lower surfaces and side faces, the system including:

(1) a conveyor truck movable along a path laid on the ground between a loading station adjacent to the warehouse and an automatic work exchanging apparatus provided adjacent to the machine tool table, said conveyor truck including:
  (a) a truck positioning device for positioning the truck with respect to the ground at a predetermined position on the path, the truck positioning device comprising:
    (i) cone bodies secured on the ground at positions on the ground for the truck to be stopped,
    (ii) an engaging device provided on the truck, the engaging device including cone plates attached to the lower end of a piston rod slidably engaged within a cylinder fixedly and vertically mounted on the truck, and
    (iii) switch means for detecting upper limit and lower limit positions of the cone plates, said piston rod having connected thereto a disc-shaped dog which can engage with upper and lower limit switches of the switch means, said cone plates being engaged with the cone bodies by actuation of the engaging device cylinder when the truck stops, wherein the truck is set and positioned at a predetermined position with respect to the ground when the dog engages with the lower limit switch, and
  (b) a pallet positioning device for positioning and supporting the pallet on the truck;
(2) an automatic work exchanging apparatus for transporting the pallet between the conveyor truck and the machine tool table, the automatic work exchanging apparatus having means for positioning the pallet on the automatic work exchanging apparatus by guiding a conveying surface provided on the undersurface and side faces of the pallet thereby controlling the position of the pallet when the pallet is transferred from the machine tool table to the conveyor truck; and
(3) pallet positioning means for positioning and fixing a pallet on the machine tool table, said pallet positioning means including:
  (a) a reference surface on the lower surface of the pallet, and
  (b) a reference surface on the machine tool table, wherein intimate contact of the pallet reference surface and the machine tool table reference surface precisely positions the pallet on the machine tool table.

2. An automated system for conveying a pallet on which a work is securely positioned between a pallet warehouse and a machine tool table, the pallet of the type having a body which includes upper and lower surfaces and side faces, the system including:
(1) a conveyor truck movable along a path laid on the ground between a loading station adjacent to the warehouse and an automatic work exchanging apparatus provided adjacent to the machine tool table, said conveyor truck including:
  (a) a truck positioning device for positioning the truck with respect to the ground at a predetermined position on the path, and
  (b) a pallet positioning device for positioning and supporting the pallet on the truck;
(2) an automatic work exchanging apparatus for transporting the pallet between the conveyor truck and the machine tool table, the automatic work exchanging apparatus comprising:
  (a) positioning means for positioning the pallet on the automatic work exchanging apparatus by guiding a conveying surface provided on the undersurface and side faces of the pallet thereby controlling the position of the pallet when the pallet is transferred from the machine tool table to the conveyor truck,
  (b) a four cornered truck laterally displaceable along circularly sectioned straight rails laid on the ground adjacent to the machine tool table,
  (c) a platform vertically movable along supports positioned at the four corners and center of said truck, the platform being connected to piston rods of cylinders mounted at two positions on the truck, the vertical stroke of the platform being adjustable by positioning nut members on the corner supports so that the uppermost and lowermost positions of said platform can be defined by engagement of blocks fixed on the platform with said nut members,
  (d) a pallet displacing device positioned on said platform, said pallet displacing device operating to transfer a pallet between the platform and the machine tool table, and p2 (e) driving means for driving the pallet displacing device; and
(3) pallet positioning means for positioning and fixing the pallet on the machine tool table, said pallet positioning means including:
  (a) a reference surface of the lower surface of the pallet, and
  (b) a reference surface on the machine tool table, wherein intimate contact of the pallet reference surface and the machine tool table reference surface precisely positions the pallet on the machine tool table.

3. A system as claimed in claim 2, wherein the positioning means includes guide rollers for supporting the lower surface of the pallet and guide rollers for guiding and controlling the side faces of the pallet, the guide rollers being rotatably mounted on the platform.

4. An automated system for conveying a pallet on which a work is securely positioned between a pallet warehouse and a machine tool table, the pallet of the type having a body which includes upper and lower surfaces and side faces, the system including:
(1) a conveyor truck movable along a path laid on the ground between a loading station adjacent to the warehouse and an automatic work exchanging apparatus provided adjacent to the machine tool table, said conveyor truck including:
  (a) a truck positioning device for positioning the truck with respect to the gound at a predetermined position on the path, and
  (b) a pallet positioning device for positioning and supporting the pallet on the truck;
(2) an automatic work exchanging apparatus for transporting the pallet between the conveyor truck and the machine tool table, the automatic work exchanging apparatus comprising:
  (a) a four corner truck laterally displaceable along circularly sectioned straight rails laid on the ground adjacent to the machine tool table,
  (b) a platform vertically movable along supports positioned at the four corners and center of said truck, (c) a pallet displacing device positioned upon said platform, said pallet displacing device operating to transfer a pallet between the platform and the machine tool table, the pallet displacing device comprising:
  (i) a slidable member having two ends and guided by guide rails disposed on the platform, the slidable member movable along the guide rails in a direction perpendicular to the ground rails adjacent to the machine tool table,
  (ii) two slidable member pinions supported at either end of the slidable member for pulling or pushing the pallet, said slidable member pinions being engageable with a rack provided on the lower surface of the pallet,
  (iii) switch means for detecting the position of the slidable member with respect to the platform, and
  (iv) a driving device for moving the slidable member along the guide rails, said driving device having a slidable member rack provided on a lower face of the slidable member and a platform pinion driven by a motor mounted on the platform, the platform pinion engageable with the slidable member rack, wherein one of the two slidable member pinions is driven by a motor and wherein the other slidable member pinion is driven by a chain provided between a sprocket coaxial with the former pinion and another sprocket connected to the latter pinion so that said two slidable member pinions are rotated in a same direction with an identical speed, and
(d) driving means for driving the pallet displacing device; and
(3) pallet positioning means for positioning and fixing the pallet on the machine tool table, said pallet positioning means including:
  (a) a reference surface on the lower surface of the pallet, and
  (b) a reference surface on the machine tool table, wherein intimate contact of the pallet reference surface and the machine tool table reference surface precisely positions the pallet on the machine tool table.

* * * * *